June 11, 1957   J. R. DAVIES   2,795,002
SOLDER WIPER ROLL
Filed Sept. 6, 1952
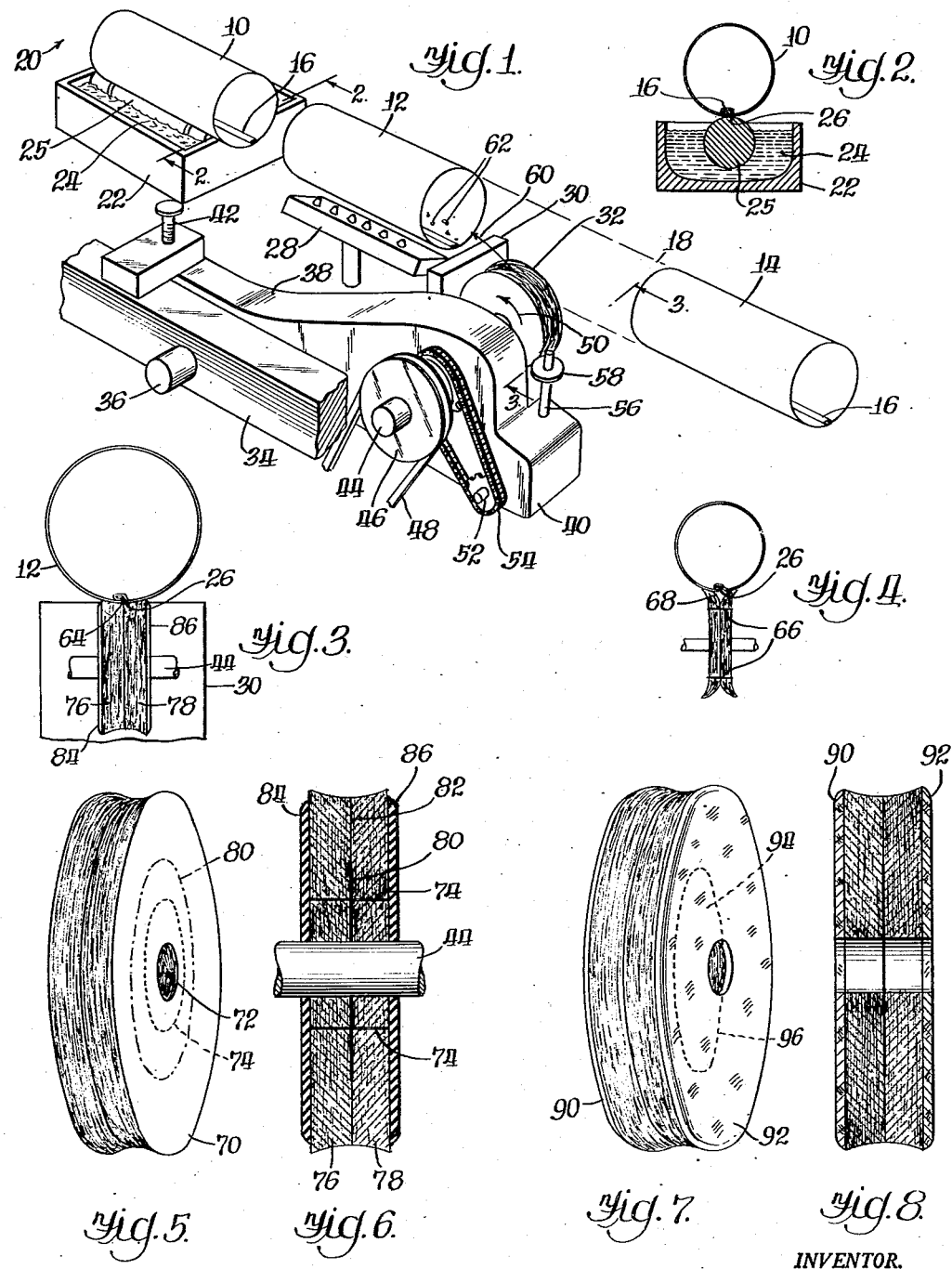
INVENTOR.
Joseph R. Davies United States Patent Office 2,795,002
Patented June 11, 1957

2,795,002

SOLDER WIPER ROLL

Joseph R. Davies, Chicago, Ill.

Application September 6, 1952, Serial No. 308,234

9 Claims. (Cl. 15—230)

This invention relates to a solder wiper roll for removing solder from the seam of a metal can, to a method of manufacturing the roll and to the method of wiping hot flowable solder from a metal surface. More particularly, it relates to a solder wiper roll made of laminations of fiber glass cloth which is to be used primarily to remove the solder properly from the longitudinal seam of a metal can sleeve, commonly called the can body. It may be adapted for wiping off solder from other can seams.

Before stating the objects of the invention, the specific application of this solder roll should be understood.

Figure 1 is a perspective, schematic illustration of a portion of a machine which forms a can body. Can bodies 10, 12 and 14 are metallic sleeves, each having a seam 16. Referring to Figure 2, this side seam 16 is shown to be the double, overlapped edges of the sleeve, which are hooked together and partially flattened so as to permit solder to flow between the overlapped edges and seal the seam. Desirably, a thin film of solder extends across the seam and usually about one-quarter inch on either side. Returning to Figure 1, these cans are moving along the path suggested by the dot-dash lines 18 by means of a tang-bearing chain moving from left to right and not shown. The sleeve or can bodies were formed at a point in advance of the numeral 20 and as they appear in Figure 1, the can has been moving over an upwardly open solder well 22 filled with solder 24, in the longitudinal center of which is a solder roll 25, see Figure 2, which is rotating in a counter-clockwise direction so as to roll solder into the opening 26 of the can body seam. Immediately after leaving the solder rolls, each can passes over a heater 28 which raises the temperature of the abutting edges of the can body and thereby the solder to a point where the excess does not drop off but can be wiped off.

The can then passes over a splash guard 30 and its under side is next engaged by a wiper roll 32, see also Figure 3. This wiper roll is the subject matter of this application.

The remaining structure shown in Figure 1 consists of a portion of the can machine frame 34 in which is journaled a shaft 36, upon the inner end of which is pivotally mounted an arm 38. The work end 40 of this arm 38 may be raised or lowered by means of a set screw 42. The work end 40 of the arm carries a shaft 44 to which is keyed a driven pulley 46, which in turn is rotated by a belt 48 driven from a suitable source of power. The wiper roll 32 is mounted on the inner end of this shaft 44 and rotates in a direction against the movement of the cans, as indicated by the arrow 50. Mounted on the lower, outer end of the arm 38 is a shaft 52 which is driven by a chain 54 from the shaft 44, and this shaft 52 in turn drives a shaft 56 upon which is mounted a circular doctor knife which removes solder that sticks to the roll. This structure is schematic only. Can machines have various kinds of structures for effecting the functions suggested by the mechanism in Figure 1.

The wiper roll shaft 44 is usually rotated from 400 to 500 R. P. M. when a wiper roll having a four and one-half inch diameter is mounted thereon. Where a wiper roll is smaller, the R. P. M. of the shaft 44 is increased and where it is larger as for a six-inch wiper roll, the speed of the shaft 44 is reduced.

Several problems stem from the action of the wiper. Firstly, the wiper has a tendency to throw solder in the direction of the arrow 60 upwardly and rearwardly into the following can body, in this case 12, which solder solidifies as droplets 62 on the inside of the can. This is called solder splash. This solder splash will contaminate certain foods. Can companies have designed splash plates timed to intercept this thrown solder although they are in limited use. With devices for catching solder splash, this application is not concerned.

This application is concerned with the character of the wiper roll 32 whose surface fibers or picks wear rapidly and actually throw the solder.

The wiper roll in general use today consists of 54 or more discs of high count cotton cloth which are stitched together. Sometimes they are given a contour such as that indicated in Figure 3 by the numeral 64, and the contour is held in place by stitching close to the periphery. A small percentage of these cotton wipers are char-treated at the factory to reduce the amount of solder that adheres to the roll. The effect of heat is to further char them which results in rapid wear. The cloth wiper roll is operating under comparatively high heat because the melting point of solder is over 500 degrees Fahrenheit.

Another operational condition which the wiper roll must meet arises when the can machine is stopped, either due to the jamming of a sheet in the sleeve-forming machine ahead of the point 20 or the necessity of changing the wiper roll due to wear. When this occurs, any can body in the position of can body 12 in Figure 1 over the heater 28 becomes excessively hot, sometimes red hot, and when the machine resumes operations, it will cause a wiper roll to burst into flame or smolder, either of which destroys the roll.

Most importantly, a cotton roll has a life of only a few hours. To replace it, a $200,000 can machine must be stopped for a minute or two. Each stop reduces output by 500 to 1000 cans.

Down time arising from the short life of the wiper rolls has become acute in recent years. Prior to the scarcity of tin, the solder used was 40–60 or 30–70, which indicate the respective proportions of the tin and lead. The melting points of the various tin-lead alloys commonly referred to as solder vary from that of lead to that of the tin-lead eutectic. Today, can companies are frequently using a solder of 3–97 with a melting point of 720 degrees Fahrenheit. This high temperature shortens the life of the wiper roll. Then, too, the can companies are increasingly using black iron sheet for certain cans in place of tin or terne plate heretofore used. This black plate requires the heater 28 of Figure 1 to be operated at a higher temperature than when tin plate or terne plate is being used for the can bodies.

The first object of this invention is to provide a wiper roll having a much longer life than the char-treated cotton wiper roll so that the downtime caused by replacing rolls is greatly decreased.

A second object is to provide a wiper roll which will have a substantially less tendency to throw solder. The solder throwing from the wiper roll results from a tendency of solder particles to temporarily adhere to the fibers or picks which constitute the nap of the roll periphery while immediately under the can body, only to be loosened and thrown in various directions, including upwardly, instead of moving in a comparatively straight line toward a splash plate such as 30 in Figure 1 located below the travel of the cans.

Applicant's wiper roll is made of layers of woven fiber glass. For at least five years, experiments have been made with fiber glass rolls because even though a fiber glass roll must sell for twelve to fifteen times the cost of the best char-treated cotton roll, its non-inflammable character held out great promise of reducing the down time on can machinery. Despite several years of experimenting, the fiber glass roll has not succeeded for standard operations. There are several reasons for this. Firstly, untreated fiber glass cloth, like so many flame-resistant materials, has little or no flexibility or resiliency. It is almost wholly inelastic. Without actually bending the cloth, one can lay it over and it will stay exactly as laid, even though a true bend in the material has not been made. A wiper made of layers of this material when applied to the seam of a can body, will spread laterally so as to form in cross section a V-shaped trough, see Figure 4. As a result of this, the edges of the cloth do not engage the solder. The centrifugal force is not sufficient to bring them back into engagement. Efforts have been made to correct this condition either by adding a rigid flange on each side of the wiper or by treating the glass fiber cloth with a thermosetting resin. In either case, the wiper too rigidly presents the hard glass fibers or picks to the solder and wipes off more than is wanted. In a good can body seam, it is desired that the solder span the crevice or crack of the seam and extend about one-quarter of an inch on each side. An untreated glass fiber wiper having stiff side flanges will wipe the seam much too clean of solder. Similarly, a wiper made of layers of resin-treated fiber glass cloth will be very stiff and will equally effectively remove more solder than is desired.

The second obstacle encountered by the experimenters with fiber glass wipers was more serious. Molten solder taken off the can seams solidifies and adheres to the glass fiber ends. This necessitated the use of a doctor knife similar to that shown by numeral 58 in Figure 1. The doctor knife in keeping the roll clear of solder cuts and wears it down more rapidly than it cuts down a cotton wiper because the glass fibers quickly dull the doctor knife which thereafter, instead of cutting chews the surface, leaving it uneven with resultant solder splash. This short life caused by the doctor knife was found accentuated by the fact that flux and dirt on the can seams collected on the solder wiper, making the action of the doctor knife all the more necessary.

A feature of applicant's invention is a coating of liquid silicone on the ends and adjacent side walls of the picks or fiber ends that form the nap of the applicant's fiber glass roll. This liquid silicone is non-volatile at operating temperatures and solder will not adhere to it. The solder is wiped off and thrown off of the surface being wiped and the solder does not adhere to the wiper roll nap and the liquid silicone does not leave the wiper roll nap. The roll would be everlasting but for slow disintegration of the fiber glass threads due to mechanical action, and due to the fact that solder flux will collect on the wiper roll slowly, and has to be removed by a suitable solvent.

Another object of this invention is to provide a method of contouring a roll made of fiber glass. The general way of making a fiber glass roll is to cut a plurality of circular discs by means of a die. Placing a concave cross section on the periphery of the roll can only be done by an edge cutting operation. Desiring the right nap for the work surface, and more particularly to receive the liquid silicone, applicant has found that rotating the roll during this contouring operation by the knife at a speed several times as great as the intended speed in use will produce a vastly superior result. An important step in this contouring operation is cooling both the knife and the wiper roll.

Another object is to provide a wiper roll which will properly adjust itself, despite a fixed concave peripheral cross section, to cans of different diameters. A wiper roll has a concave peripheral cross section on a radius approximately that of the smallest can most commonly used. When a larger can is run through the can-making machine, the wiper roll must spread and conform to the cross section of the can.

A feature of this invention is the provision of flexible side flanges, one on each side of the wiper roll, which are resilient but have more structural strength than the glass fiber discs. While a can may distort the cross-sectional contour of the roll, the moment the roll leaves the can surface, and side flanges restore the cross section. The result is that the roll continuously moves into the the can surface on its original manufactured contour and if the pressure and the cross section of the can is such that the can must be flattened, the flattening is being continuously re-done. These flanges are made of rubber or cork, and one consideration in selecting the material of which the flanges are made is that the material will wear at about the same rate as the glass fibers.

These and such other objects as may hereinafter appear are attained in two embodiments of the invention shown in the drawings, wherein:

Fig. 1 is a schematic, perspective view of the can wiper roll stage of a can body-making machine;

Fig. 2 is a view taken on the line 2—2 of Fig. 1;

Fig. 3 is a view taken on the line 3—3 of Fig. 1;

Fig. 4 is an illustration of the action of a glass fiber cloth wiper unsupported by side flanges consisting of cloth layers which have not been treated by a thermosetting resin;

Fig. 5 is a perspective view of a glass fiber wiper roll section, which constitutes one-half of one of applicant's finished glass fiber wiper rolls;

Fig. 6 is a diametric cross section of one of applicant's fiber rolls mounted on its shaft in the can-making machine with flexible, removable side flanges; and, Figs. 7 and 8 are a perspective and a sectional view of an improved wiper roll having permanently assembled cork flanges.

Continuing to refer to the drawings, in Fig. 5, there is shown in perspective a roll section 70 consisting of approximately 60 sheets of fiber glass cloth. This cloth may be untreated or treated with a thermosetting resin. There is a central hole 72. The maximum number of fiber glass cloth sheets that the best stitching machine can handle is about this number. A row of stitching 74 is approximately one-half inch from the periphery of the hole. This makes a roll section of approximately five-sixteenths inch thickness. A wiper roll is about five-eighths of an inch wide and hence two sections are required.

Applicant discovered that when combining two of these roll sections to form a complete wiper roll by mounting them adjacent each other on a shaft and held merely by end flanges, they become displaced circumferentially with respect to each other in use. This is probably due, referring to Fig. 3, to the fact that the section designated 76 engages more of the can surface than does the section 78 which is aligned with the opening 26. Bearing in mind that the glass fiber wiper functions well only if there is some lateral movement of the fibers and the glass sheets during operation, it will be appreciated that even circular displacement of the two roll sections with respect to each other is undesirable.

Returning to Fig. 5, applicant applies a strong adhesive between the central portion of the facing sides of two roll sections to form a single roll. This adhesive is confined within the area indicated by the dot-dash line 80 in Fig. 5, thereby leaving the outer half to three-quarters of an inch of the two-section, finished wiper roll free to move laterally under the effects of engaging the can body seam and of centrifugal force.

Applicant's next step is to mount the two-section wiper roll on a shaft between two semi-rigid plates or flanges.

not shown. These flanges do not hold the layers of fiber glass cloth tightly to each other at the periphery. It is important in this cutting or contouring step that lateral movement of the peripheries of the discs occur. The shaft is then rotated at 2000 to 3000 R. P. M., a speed from four to six times faster than the intended speed for the roll in use. The knife is a pointed one and is moved across the periphery in a plane containing the axis of the shaft to give any selected contour. In contouring a simple concave cross section such as shown in Fig. 6, applicant has succeeded in performing the step with one pass of the knife from one side to the other. The knife is mounted on a pivot and swings across the peripheral face of the wiper roll. During this action, the applicant applies either air or water to both the knife and the roll for cooling purposes.

Applicant by studying worn cotton wiper rolls has discovered that a major cause for solder splash arises from the pitting of the surface of the cotton roll. The cotton roll may work very well for a short time, but then commences to throw solder. A study of the surface of the roll shows that the heat has burned small pits in the surface, and globules of solder are picked up by these pits. Since the surface of these pits is no longer in a true circumference of the roll, the solder thrown from a pit will not go along a straight tangent but will fly in various directions including upwardly. In the case of wiper rolls made of glass fiber cloth in the past, the surface was never contoured or even worked. Glass fiber cloth is quite slippery and in cutting the discs to size, uniformity of diameter with respect to the centering hole is impossible with the result that when such discs are assembled into a wiper roll, the periphery is very irregular and produces much the same effect as pits in a cotton roll. Applicant is the first to recognize that the contouring or truing of the glass fiber roll is of prime importance. Performing this step at the high speed of 2000 to 3000 R. P. M. as heretofore described, is a major factor in obtaining a satisfactory finished product.

Applicant then removes the fiber glass roll from his work shaft on which the contouring was performed and treats the fiber cloth with a thin film of liquid silicone. This material neither evaporates nor hardens under the intermittent heat of the wiping action, and because of its cohesiveness, rapidly covers the exposed ends and adjacent side walls of the resin-coated fiber glass with a thin film. The silicone is painted on the periphery and it quickly penetrates throughout the entire roll. The roll is not dipped in liquid silicone because this would get it too wet. Applicant wants the silicone to permeate through the entire disc so that the center of the disc will act as a reservoir which slowly feeds, through the cohesive qualities of the silicone, silicone to the peripheral surface of the roll.

Only a limited amount is applied so that none will be transferred to the surface of the solder left in the side seams of the can bodies. Keeping silicone off the can is important, particularly at the ends of the side seams because subsequently, can ends may be attached, also with a solder seam, and a clean metal surface is needed in order to effect a good bond. Solder will not adhere to the silicone and as long as the glass fiber ends and adjacent side walls retain this thin silicone coating, the solder will be wiped off in a downwardly direction against whatever type of splash plate the particular can body machine may employ.

There are many liquid silicones. Applicant is using dimethylpolysiloxane. The general formula for the silicones of the type applicant has tried is $R_3SiO—(R_2SiO)^x$, where "R" represents the hydrocarbon and "$x$" represents the number of polymers. The specific formula of the dimethylpolysiloxane is $(CH_3)_3SiO—[(CH_3)_2SiO]^x$. This product is sold commercially by Linde Air Products Company of Chicago as L-45. Applicant has found it most useful because it does not start to break down until a temperature of about 200° centigrade or 350° Fahrenheit, in air, is reached. This temperature is lower than the melting point of some of the solders now in use, but the heat attained on the surface of the solder wiper is actually closer to 300° Fahrenheit or well under the break down temperature of dimethylpolysiloxane, because any point on the solder wiper is subject to only intermittent contact with the solder. Applicant finds that in actual practice, this particular liquid silicone does not reach its own break down point.

Applicant has also experimented on Linde Air Products' L-41, which is diethylpolysiloxane. In its chemical formula, the radical $(C_2H_5)$ replaces the $(CH_3)$ of the dimethylpolysiloxane. The L-41 has a comparatively high viscosity namely about 5000 centistokes, and is somewhat tacky and therefore less desirable. However, this particular quality, undesirable in applicant's business, could be reduced by reducing the viscosity of diethylpolysiloxane to perhaps 1000 centistokes. Diethylpolysiloxane has a break down temperature of about 175° centigrade or 300° Fahrenheit. For use in wiping solder of the highest quality, that is 40–60 or 30–70, having a comparatively low melting point, a diethylpolysiloxane of low viscosity is satisfactory. For the broader application to include higher melting point solders, applicant has found the dimethylpolysiloxane superior.

The criteria for selecting a particular silicone are these: Firstly, the silicone must be liquid and of a low viscosity so that it will permeate the entire wiper roll. Secondly, the silicon must have a substantially constant viscosity in the range between normal temperatures, that is a temperature as low as 40 or 50 degrees Fahrenheit, and the temperature attained by the wiper roll of 200° Centigrade or 350° Fahrenheit, the surface of which intermittently contacts the solder of temperatures approximating 700° Fahrenheit. As heretofore stated, soldering temperatures are rising because of the decreased amount of tin in the solder, and the range may be from 50 to 750 degrees. Thirdly, the liquid silicone must be substantially non-volatile. The life of applicant's solder roll before re-contouring and re-working depends upon maintaining the thin film of silicone on the nap of the roll. Applicant's roll will last for many hours if the silicone is substantially non-volatile. The fourth criterion is non-inflammability.

The application of the liquid silicone has a softening effect upon the thermosetting resin where fiber glass cloth having this treatment is used in the wiper roll. As mentioned heretofore, the thermosetting resin-treated fiber glass cloth is too stiff and will wipe off too much solder from the can body seam. Applicant paints the liquid silicone on the edge while the roll is being slowly rotated. The liquid silicone penetrates through the entire thickness of the roll. When this roll is placed in use, silicone on the surface may be worn away, but because the liquid silicone does not harden, the centrifugal force of the rotating roll and the cohesive action of the silicone tend to keep feeding additional quantities of silicone slowly into the peripheral surface where the work is being performed.

Months of experimenting have demonstrated this great advantage of the silicone-coated glass fibers. Applicant's wiper roll functions equally well with high melting point solders as it does with low melting point solders. Increasing the heat output of the heater 28 of Fig. 1 does not adversely affect its functioning. When the can body-making machine is down and a can body such as 12 in Fig. 1 is over the heater 28, and with the heater not turned off, on resumption of operation, the wiper will properly wipe off the solder from this overheated can.

Applicant's wipers have many times the life of the cotton wiper roll. There is never any burning and as will appear in a moment, but for one factor, could be used almost indefinitely as there is no substantial wear. No doctor knife is used on applicant's wiper roll.

The wiper roll is sold in the form thus far described but it is not complete without two flexible disc flanges on each side. It will be observed that the stitching on the roll illustrated in Figs. 5 and 6 is set back from the periphery by a substantial distance, actually in the four-inch roll by about one and a half inches. This leaves the annulus outside the stitching free for lateral movement. The centrifugal force is not enough to hold the roll properly against the can seam. A metal or other stiff flange is not satisfactory even though its diameter was an inch less than the diameter of the roll leaving a half-inch annulus of laterally unsupported glass fiber cloth. The reason is that the lateral movement of the glass cloth, outwardly of these flanges, varied greatly by changes in the distance from the flanges. Thus, while a wiper having its peripheral edges spaced a half inch outwardly of the flanges might work fairly well, if the spacing from the flanges was reduced by only one-eighth inch, due to wear the lateral movement of the cloth layers was greatly reduced. The cross sectional configuration of the contouring of applicant's wiper roll is based on the smallest diameter can in standard use. This wiper roll tends to adjust its contour for larger diameter cans. This means that the outer layers must be spread a little more and any stiff flanges on the sides of the roll will play a very important part in determining the stiffness of the layers as they present themselves to the solder.

After much experimenting, applicant found that a disc of buna rubber having a thickness from one-sixteenth to three-sixteenths of an inch, with a durometer of approximately 90, worked well. These rubber discs have a diameter of one-fourth inch less than the diameter of the roll so as to leave an unsupported annulus of fiber class cloth of about one-eight inch therearound.

Indefinite life is not possible because the can bodies deposit flux and other foreign material such as dust on the wiper. As this slowly accumulates, the effect of the silicone is lost. The thin film of silicone on the ends of glass fibers seems to wear away with time, and the repeated striking on the can bodies destroys the contour.

Under these circumstances, the roll is removed and the process of treating the wiper roll from the contouring step onward is repeated to return the roll to substantially its original condition although its diameter may be reduced by perhaps one-eighth inch. In the renewing process, the first step is to treat the surface of the roll with a solvent such as trichlorethylene. This will remove the flux, the dirt and a substantial amount of the silicone. This step is ordinarily performed by hand with manual, transverse working of the periphery of the layers of the wiper roll. Thereafter, the roll is re-contoured and a new application of liquid silicone is applied.

In Figs. 7 and 8, applicant shows an improved fiber glass wiper roll. The main body of this roll is identical with the roll illustrated in Figs. 5 and 6, but the buna rubber discs 84 and 86 have been replaced by cork or cork composition flanges 90 and 92. These flanges extend to the periphery of the wiper roll. They form a part of the wiper roll because they are joined thereto by a spot of adhesive 94 which is confined substantially within the dotted line 96. These cork flanges have the great advantage of more constantly maintaining a selected lateral pressure on the cloth layers at the periphery for they wear down with these layers. They vary in thickness from about one-sixteenth to three-sixteenths of an inch. They possess a flexibility substantially superior to the fiber glass layers themselves and comparable to the buna rubber. At ordinary wiping heats, the cork is not combustible. Also, cork does not change consistency with heat.

Having thus described my invention, what I claim is:

1. A solder wiper roll comprising a plurality of registered discs of woven fiber glass, a rubber disc having a diameter slightly less than that of the fiber glass discs disposed on each side of the registered glass fiber discs, and means adjacent the roll center for holding said discs in assembled relationship, whereby the rubber discs will yieldingly hold the fiber glass discs in parallel planes.

2. A solder wiper roll comprising a plurality of registered discs of woven fiber glass, a disc of cork composition disposed on each side of the registered glass fiber discs, and means adjacent the roll center for holding said discs in assembled relationship, whereby the discs of cork composition will yieldingly hold the fiber glass discs in parallel planes.

3. A solder wiper roll comprising a plurality of registered discs of woven fiber gass to form a roll, a contoured periphery having a concave cross section on said roll, and a side disc made of sheeting more resilient than the fiber glass discs disposed on each side of the roll, the periphery of the side discs registering with the peripheries of the outside glass fiber discs whereby under pressure against the entire cross periphery of the roll the contour will become uniformly less concave.

4. A solder wiper roll comprising a plurality of registered discs of woven fiber glass to form a wiper roll, and a resilient side disc made of a material having approximately the same wear resistant qualities as the fiber glass disposed on each side of the roll, whereby as the fiber glass wears, the side discs equally wear and do not space the wiping surface away from the metal being wiped.

5. The solder wiper roll of claim 4 wherein the side discs have their outer peripheral edges beveled.

6. A solder wiper roll comprising two wiper roll sections each composed of a plurality of registered discs of fiber glass cloth stitched to each other, means engaging the central portions only of the sides of the two sections which abut each other for holding the rolls to each other in non-rotatable relationship.

7. A wiper roll comprising two wiper roll sections each composed of a plurality of registered discs of fiber glass cloth stitched to each other, and means engaging the central portions only of the outer sides of the two sections which abut each other for holding the rolls to each other in non-rotatable relationship, said means consisting of a strong adhesive which lies within a circle spaced from the periphery of the roll by more than half an inch.

8. A solder wiper roll comprising a plurality of registered discs of woven fiber glass, a side disc of sheeting more resilient than the fiber glass cloth disposed on each side of the registered glass fiber discs and having peripheral wearing qualities comparable to that of the woven fiber glass discs, and means adjacent the roll center for holding said discs in assembled relationship, whereby the side discs will yieldingly hold the fiber glass discs in parallel planes.

9. A solder wiper roll comprising a plurality of registered discs of woven fiber glass, a rubber disc disposed on each side of the registered glass fiber discs, and means adjacent the roll center for holding said discs in assembled relationship, whereby the rubber discs will yieldingly hold the fiber glass discs in parallel planes.

References Cited in the file of this patent

UNITED STATES PATENTS

| | | |
|---|---|---|
| 872,966 | Painter | Dec. 3, 1907 |
| 1,572,223 | Robbins | Mar. 6, 1926 |
| 2,284,716 | Benner et al. | June 2, 1942 |
| 2,355,667 | Melton et al. | Aug. 15, 1944 |
| 2,413,146 | Larson | Dec. 24, 1946 |
| 2,698,504 | Lotz | Jan. 4, 1955 |

FOREIGN PATENTS

| | | |
|---|---|---|
| 522,040 | Great Britain | June 1940 |

OTHER REFERENCES

British Plastics, October 1946, pages 459–464.